US008811525B2

(12) United States Patent
Eom et al.

(10) Patent No.: US 8,811,525 B2
(45) Date of Patent: Aug. 19, 2014

(54) DUAL POLARIZATION ANTENNA AND METHOD FOR TRANSMITTING AND RECEIVING SIGNAL USING THE SAME

(75) Inventors: Soon Young Eom, Daejeon-si (KR); Young Bae Jung, Daejeon-si (KR); Soon Ik Jeon, Daejeon-si (KR); Jae Ick Choi, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 74 days.

(21) Appl. No.: 13/356,879

(22) Filed: Jan. 24, 2012

(65) Prior Publication Data

US 2012/0189078 A1 Jul. 26, 2012

(30) Foreign Application Priority Data

Jan. 25, 2011 (KR) ........................ 10-2011-0007510

(51) Int. Cl.
*H04B 7/06* (2006.01)

(52) U.S. Cl.
USPC ........... 375/295; 375/299; 375/267; 375/259; 375/316; 375/347; 375/349

(58) Field of Classification Search
CPC ...... H04B 7/0469; H04B 7/10; H04B 7/0617; H04B 7/0413; H04B 7/0634; H04B 7/0408; H04B 7/0697; H04B 7/04; H04B 7/02; H04L 25/03343; H04L 2025/03426; H04L 27/2626; H04L 1/06; H04W 16/28
USPC ......... 375/299, 295, 267, 259, 260, 316, 347, 375/349
See application file for complete search history.

(56) References Cited

U.S. PATENT DOCUMENTS

| | | | | |
|---|---|---|---|---|
| 7,538,740 | B2 * | 5/2009 | Korisch et al. | 343/844 |
| 8,160,530 | B2 * | 4/2012 | Corman et al. | 455/276.1 |
| 8,259,005 | B1 * | 9/2012 | Lam et al. | 342/174 |
| 2003/0134664 | A1 * | 7/2003 | Zancewicz | 455/562 |
| 2003/0162566 | A1 * | 8/2003 | Shapira et al. | 455/561 |
| 2004/0121810 | A1 * | 6/2004 | Goransson et al. | 455/562.1 |
| 2009/0058725 | A1 * | 3/2009 | Barker et al. | 342/372 |
| 2011/0109507 | A1 * | 5/2011 | Warnick | 342/368 |
| 2012/0287978 | A1 * | 11/2012 | O'Keeffe et al. | 375/222 |

FOREIGN PATENT DOCUMENTS

| | | | |
|---|---|---|---|
| JP | 06-244837 | A | 9/1994 |
| KR | 1020070068756 | A | 7/2007 |

OTHER PUBLICATIONS

Klaus Ingemann Pedersen and Preben Elgaard Mogensen, A Simple Downlink Antenna Array Algorithm Based on a Hybird Scheme of Transmit Diversity and Conventional Beamforming, 2001, IEEE.*

* cited by examiner

*Primary Examiner* — Siu Lee
(74) *Attorney, Agent, or Firm* — William Park & Associates Patent Ltd.

(57) ABSTRACT

The present invention relates to a general active array antenna apparatus capable of environmentally and temporally controlling radio frequency (RF) polarization resource necessary for wireless communication in order to improve communication quality and increase communication capacity. The antenna according to the present invention has a form of an active array antenna element, wherein each active array antenna element has a structure in which it may generate orthogonal dual polarizations and includes two input terminals and output terminals. An end orthogonal dual polarization antenna is connected to a polarization control apparatus that may process analog or digital signals, and the polarization control apparatus is controlled by or communicate with an antenna main controlling apparatus performing a polarization control algorithm. Ultimately, an object of this antenna apparatus is to improve communication quality and increase communication capacity.

14 Claims, 9 Drawing Sheets

DUAL POLARIZATION ANTENNA AND METHOD FOR TRANSMITTING AND RECEIVING SIGNAL USING THE SAME

CROSS-REFERENCE TO RELATED APPLICATIONS

This application claims the benefit of priority of Korean Patent Application No. 10-2011-0007510 filed on Jan. 25, 2011, which is incorporated by reference in their entirety herein.

BACKGROUND OF THE INVENTION

1. Field of the Invention

The present invention relates to an active array antenna apparatus capable of controlling a radio frequency (RF) polarization in real time, and more particularly, to a general antenna apparatus capable of environmentally and temporally controlling polarization resources necessary for wireless communication in order to improve communication quality and increase communication capacity.

2. Related Art

A wireless terrestrial/satellite communication system generally transmits/receives data information through antennas using a predetermined frequency. Here, as an important element for transmitting and receiving signals in the wireless terrestrial/satellite communication system, antennas are present at an end of the wireless terrestrial/satellite communication system. These antennas should be configured to efficiently transmit and receive electromagnetic waves. Therefore, the research and development of the antenna has been actively conducted.

A significantly number of antennas are present. However, as a generally used high frequency antenna, there are a dipole antenna, a monopole antenna, a patch antenna, a horn antenna, a parabolic antenna, a helical antenna, a slot antenna, and the like. These antenna are applied and used in various forms according to a communication distance and a service area.

As necessary resources of the wireless terrestrial/satellite communication system, there are frequency, polarization, space, and direction. In the present and the future, a frequency resource, which is the most important resource for wireless communication, has been exhausted due to an increase in kinds of wireless communication services. In addition, a multiple input multiple output (MIMO) communication technology has been necessarily demanded due to an increase in bandwidth of a service. An object of this MIMO communication technology is to increase communication capacity by performing independent multi-channel transmission using multiple antennas. However, most satellite communication/mobile communication terminal or relay/base station antennas for MIMO communication have currently used the defined fixed polarization. In this antenna system structure using the fixed polarization, it is expected that service quality is deteriorated to an interference problem between services, or the like, caused by an increase in a service and an increase in a bandwidth in the future. In order to overcome this problem, an antenna technology of improving service quality and increasing service capacity by temporally variably controlling the polarization of the antenna so as to be appropriate for wireless environment and system requirement had been demanded.

In the future, due to saturation (depletion) of the wireless communication, elastic application/utilization of new radio resources such as a polarization, a space, a direction, or the like, has been absolutely required.

SUMMARY OF THE INVENTION

The present invention provides a general active array antenna apparatus capable of environmentally and temporally controlling an RF polarization of a wireless communication antenna apparatus in order to improve quality of wireless communication services and increase communication capacity thereof in the future.

In an aspect, a transmission antenna apparatus is provided. The transmission antenna apparatus includes: a signal distributing unit distributing a plurality of input signals to generate independent signals; a channel inputting unit inputting each of the independent signals to a corresponding channel; a multi channel unit including a plurality of channels to which the independent signals are input; and a dual polarization antenna unit generating and transmitting a dual polarization, wherein the multi channel unit adjusts phases and/or amplitudes of the independent signals for each of the channels to which the independent signals are input and intersects and combines the phase and/or amplitude adjusted independent signals with respect to the plurality of input signals to generate a plurality of combined independent signals, and wherein the dual polarization antenna unit transmits each of the plurality of combined independent signals input from the multi channel unit as orthogonal components of the dual polarization.

The adjustment of the phases and/or the amplitudes of the independent signals for each of the channels may be temporally controlled.

The dual polarization antenna unit may include a plurality of dual polarization antenna elements, wherein the dual polarization antenna element has an orthogonal intersecting structure or an orthogonal intersecting dipole structure and simultaneously generates a plurality of independent orthogonal polarizations based on the structures.

The plurality of input signals may be two different input signals, the signal distributing unit may distribute two independent signals from each of the two different input signals, the multi channel unit may attenuate and remove one of independent signals configuring the combined independent signals, for each of the two different input signal, and the dual polarization antenna unit may transmit two combined independent signals of which one is attenuated and removed as each of orthogonal components of the orthogonal polarizations.

The signal distributing unit may receive two input signals to distribute each of two independent signals, the multi channel unit may attenuate and remove one of two independent signals configuring the combined independent signals, and the dual polarization antenna unit may transmit two combined independent signals of which one is attenuated and removed as each of orthogonal components of the orthogonal polarizations.

The channel inputting unit may intersect and input independent signals distributed from the plurality of input signals with respect to each of the channels of the multi channel unit.

A weight for the phase and/or the amplitude may be added to each of the channels to which the independent signal is input to adjust the phase and/or the amplitude of the independent signal.

The transmission antenna apparatus may further include a monitoring/controlling unit provided at a separate position from the signal distributing unit, the channel inputting unit, the multi channel unit, and the dual polarization antenna unit, wherein the monitoring/controlling unit controls the adjustment of the phase and/or the amplitude of the independent signal and selects an independent signal to be attenuated and removed.

The control of the adjustment of the phase and/or the amplitude of the independent signal and the selection of the independent signal to be attenuated and removed may be performed in a base station apparatus connected to the antenna apparatus.

In another aspect, a reception antenna apparatus is provided. The reception antenna apparatus includes: a dual polarization antenna unit receiving a dual polarization signal; a multi channel unit including a plurality of channels to which each of orthogonal components of the dual polarization signal is input; a signal combining unit combining signals with each other, wherein the multi channel unit distributes independent signals having different characteristics in each of the orthogonal components to input the distributed independent signals for each of the channels and adjusts and outputs phases and/or amplitudes of the independent signals for each of the channels, and wherein the signal combining unit combines signals having the same characteristics among the independent signals output from the multi channel unit with each other.

In another aspect, a method for transmitting a signal using a dual polarization antenna is provided. The method includes: distributing each of a plurality of input signals as a plurality of independent signals; inputting each of the plurality of independent signals to a corresponding channel; adjusting phases and/or amplitudes of the independent signals for each of the channels to which the independent signals are input; intersecting and combining the phase and/or amplitude adjusted independent signals with respect to the plurality of input signals to generate combined independent signals; and inputting and transmitting each of the combined independent signals as orthogonal components of a dual polarization antenna.

The adjustment of the phases and/or the amplitudes of the independent signals may be temporally controlled.

The plurality of input signals may be two different input signals, in the distributing, two independent signals may be distributed from each of the two different input signals, in the adjusting, one of independent signals configuring the combined independent signals may be attenuated and removed for each of the two different input signal, and in the transmitting, two combined independent signals of which one is attenuated and removed may be input as each of the orthogonal components of the dual polarization antenna.

In the distributing, two independent signals may be distributed from each of two input signals, in the adjusting, one of the two independent signals configuring the combined independent signals may be attenuated and removed, and in the transmitting, two combined independent signals of which one is attenuated and removed may be input as each of the orthogonal components of the dual polarization antenna.

In the adjusting, a weight for the phase and/or the amplitude may be added to each of the channels to which the independent signal is input to adjust the phase and/or the amplitude of the independent signal.

In another aspect, a method for receiving a signal using a dual polarization antenna is provided. The method includes: receiving a dual polarization signal; distributing independent signals having different characteristics in each of the orthogonal components; inputting the distributed independent signals for each of a plurality of channels adjusting phases and/or amplitudes of the independent signals for each of the channels; and combining signals having the same characteristics among the phase and/or amplitude adjusted independent signals with each other.

In the present invention described above, the antenna, which is all kinds of antennas including two input and output terminals and capable of forming a dual polarization, includes a unit antenna element, an array antenna, or the like.

DESCRIPTION OF EXEMPLARY EMBODIMENTS

Figure 1:
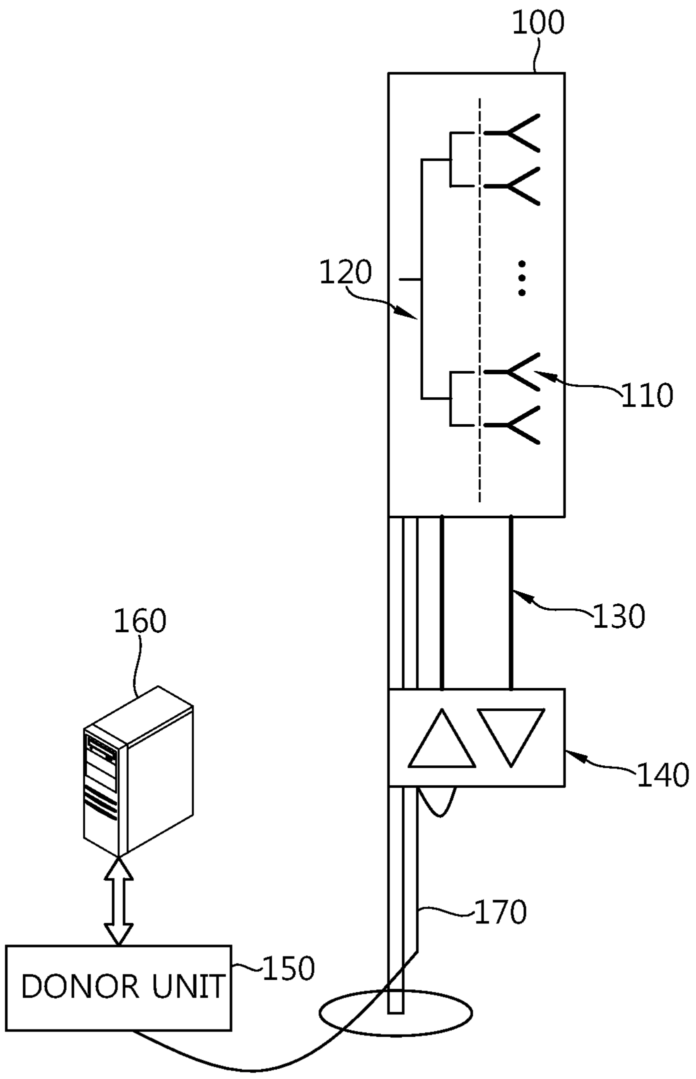
FIG. 1 is a diagram schematically showing a configuration of a passive array antenna apparatus used for a base station antenna according to the related art.

The present invention relates to an active array antenna apparatus for controlling an RF polarization in real time and a method for transmitting and receiving a signal using the same. In the active array antenna apparatus for controlling an RF polarization in real time according to an exemplary embodiment of the present invention, each antenna element has an active array antenna element form and also has an antenna structure capable of generating an orthogonal dual polarization. In addition, each antenna element includes two input or output terminals, and signals input or output through two terminals may have independent controlled amplitudes and phases. Here, the amplitude and phase control of two orthogonal component signals may be performed by an analog or digital polarization control apparatus.

The polarization control apparatus may include an analog active part, a digital signal processing unit, or the like, therein according to a configuration of an antenna system. The polarization control apparatus is connected to an end orthogonal dual polarization antenna, and may be controlled by or communicate with an antenna main controlling unit performing a polarization control.

Hereinafter, the present invention will be described with reference to the accompanying drawings. In describing the present invention, a description for portions obvious to those skilled in the art will be omitted in order not to obscure the gist of the present invention. In addition, the same reference numerals will be used to describe the same components through the accompanying drawing for convenience of explanation and understanding.

It is to be noted that each of terms described below is used only in order to help the understanding of the present invention and each manufacturing company or study group may use different terms for the same use.

In addition, it is noted that each component of the antenna system described in the present description may be applied to all of transmission and reception and uplink transmission and downlink transmission.

FIG. 1 is a diagram schematically showing a configuration of a passive array antenna apparatus used for a base station antenna according to the related art.

The passive array antenna apparatus includes a passive array antenna 100, a remote head unit (RRH) 140, a donor unit 150, and a baseband base station apparatus 160. The passive array antenna 100 includes a plurality of passive antenna array elements 110 and a feed circuit 120 combining or distributing power for the plurality of passive antenna array elements 110. The remote head unit 140 includes high output amplification, low noise amplification, frequency conversion, and digital to optical signal conversion devices. The passive array antenna 100 and the remote head unit 140 may be connected to each other by a simple coaxial cable. The donor unit 150 connected to the base station apparatus 160 and the remote head unit 140 may be connected to each other by an optical cable.

The antenna apparatus according to the related art does not include a real time polarization conversion function and a beam forming/beam scan function and has low antenna efficiency and low system power efficiency due to feed loss of the feed circuit 120.

Figure 2:
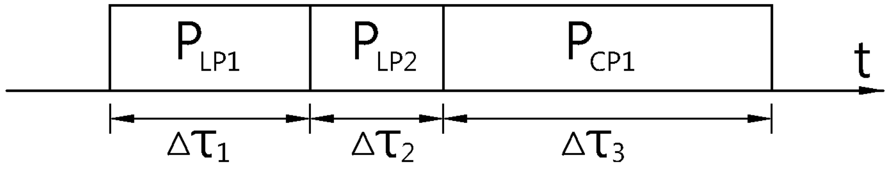
FIG. 2 is a diagram schematically describing that different polarizations are transmitted through real time scheduling in a polarization control active array antenna apparatus according to the present invention.

FIG. 2 is a diagram schematically describing that different polarizations are transmitted through real time scheduling in a polarization control active array antenna apparatus according to the present invention. Referring to FIG. 2, a real time RF polarization control active array antenna apparatus proposed in the present invention provides a function of performing transmission and reception while changing the polarization according to real time scheduling, unlike the antenna apparatus according to the related art. For example, a linear polarization 1 ($P_{LP1}$) may be generated during $\Delta t_1$, a linear polarization 2 ($P_{LP2}$) may be generated during $\Delta t_2$, and a circular polarization 1 ($P_{CP1}$) may be generated during $\Delta t_3$, from the array antenna apparatus.

Figure 3:
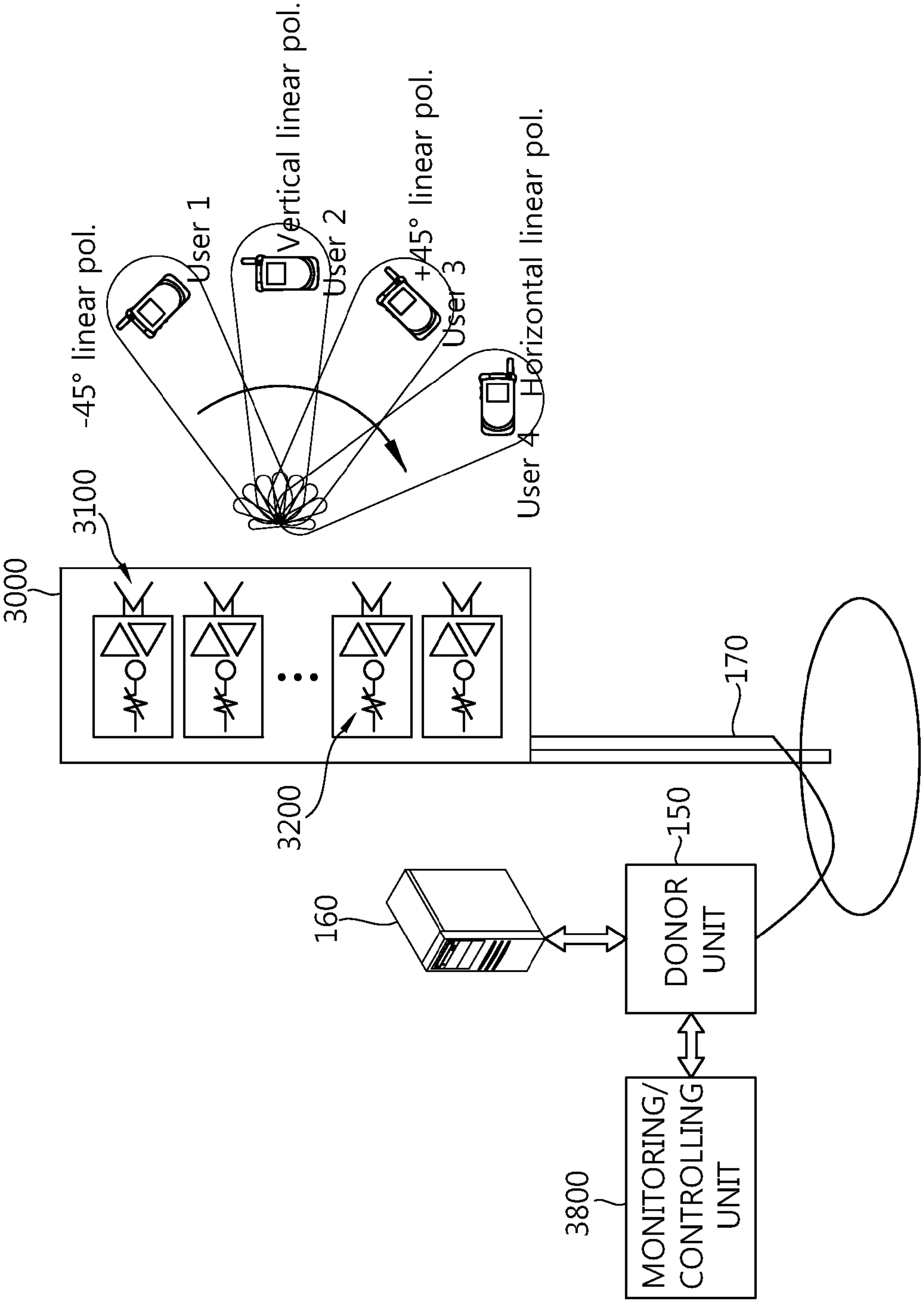
FIG. 3 is a diagram schematically showing an example of a configuration of a real time RF polarization control active array antenna apparatus according to an exemplary embodiment of the present invention.

FIG. 3 is a diagram schematically showing an example of a configuration of a real time RF polarization control active array antenna apparatus according to an exemplary embodiment of the present invention. The real time RF polarization control active array antenna apparatus includes an active array antenna apparatus 3000, a monitoring and controlling unit 3800, a donor unit 150, and a baseband base station apparatus 160. The active array antenna apparatus 3000 includes a plurality of active antenna array elements 3100, a multi active channel unit 3200 providing functions of a remote head unit, that is, a transmission high output amplification function, a reception low noise amplification function, and a function capable of an amplitude and a phase of active channels, and an uplink and downlink frequency conversion and digital to optical signal conversion device (not shown). The active array antenna apparatus 3100 and the donor unit 150 may be connected to each other by an optical cable.

The real time RF polarization control active array antenna apparatus according to the exemplary embodiment of the present invention may provide a real time polarization conversion function and a three dimensional beam forming/three dimensional beam scan function, and also provide significantly high antenna efficiency and high system power efficiency since it has an active feed structure.

Hereinafter, a configuration of the active array antenna apparatus 3000 will be described in detail. Here, for convenience of explanation, a time division duplex (TDD) type WiMAX (or Wibro) system will be described as an example of a system according to the exemplary embodiment of the present invention.

Figure 4:
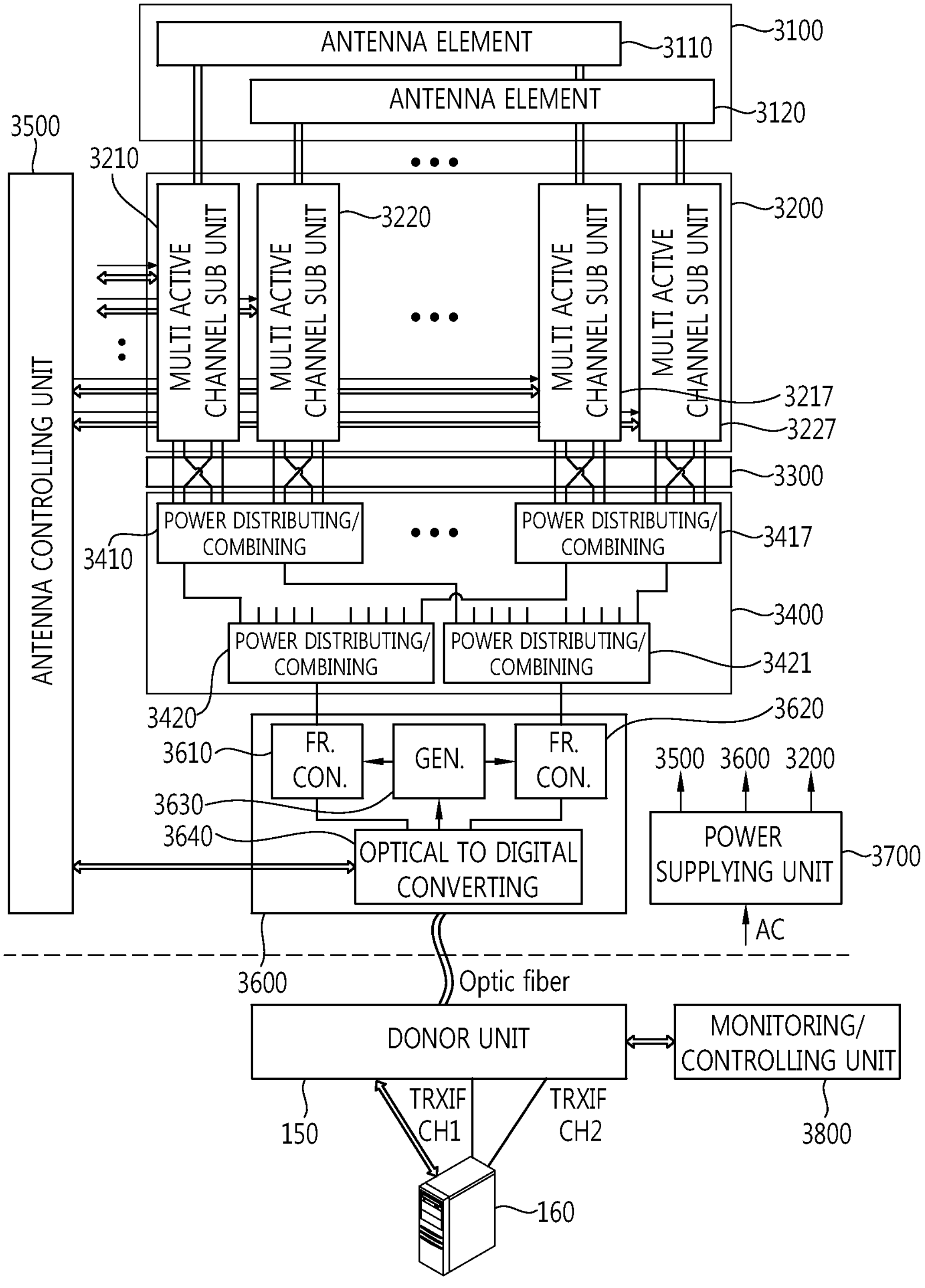
FIG. 4 is a diagram schematically showing a configuration of a real time RF polarization control active array antenna apparatus and an example of a configuration of an interface for the real time RF polarization control active array antenna apparatus according to the exemplary embodiment of the present invention.

FIG. 4 is a diagram schematically showing a configuration of a real time RF polarization control active array antenna apparatus 3000 and an example of a configuration of an interface for the real time RF polarization control active array antenna apparatus 3000 according to the exemplary embodiment of the present invention.

The donor unit 150 and the baseband base station apparatus 160 may be installed inside a house, and the active array antenna apparatus 3000 except for the monitoring/controlling unit 3800 may be installed outside the house.

The real time RF polarization control active array antenna apparatus 3000 includes an active array antenna element 3100, a multi active channel unit 3200, a polarization reconstruction combining unit 3300, a power distributing/combining unit 3400, an antenna controlling unit 3500, a frequency converting/digital to optical converting unit 3600, and a power supplying unit 3700. Here, the monitoring/controlling unit 3800 may be installed inside the home so as to be independently interfaced with the donor unit 150.

The active array antenna element 3100 may include $N_1$ horizontal array elements and $N_2$ vertical array elements. The $N_1$ horizontal array elements may provide horizontal beam forming and beam scan functions, and the $N_2$ vertical array elements may provide vertical beam forming and beam scan functions. Here, for convenience of explanation, a structure in which eight antenna elements are arranged in each of two layers, for example, a case in which two horizontal array elements and eight vertical array elements are arranged will be described as an example of the present invention.

Figure 5:
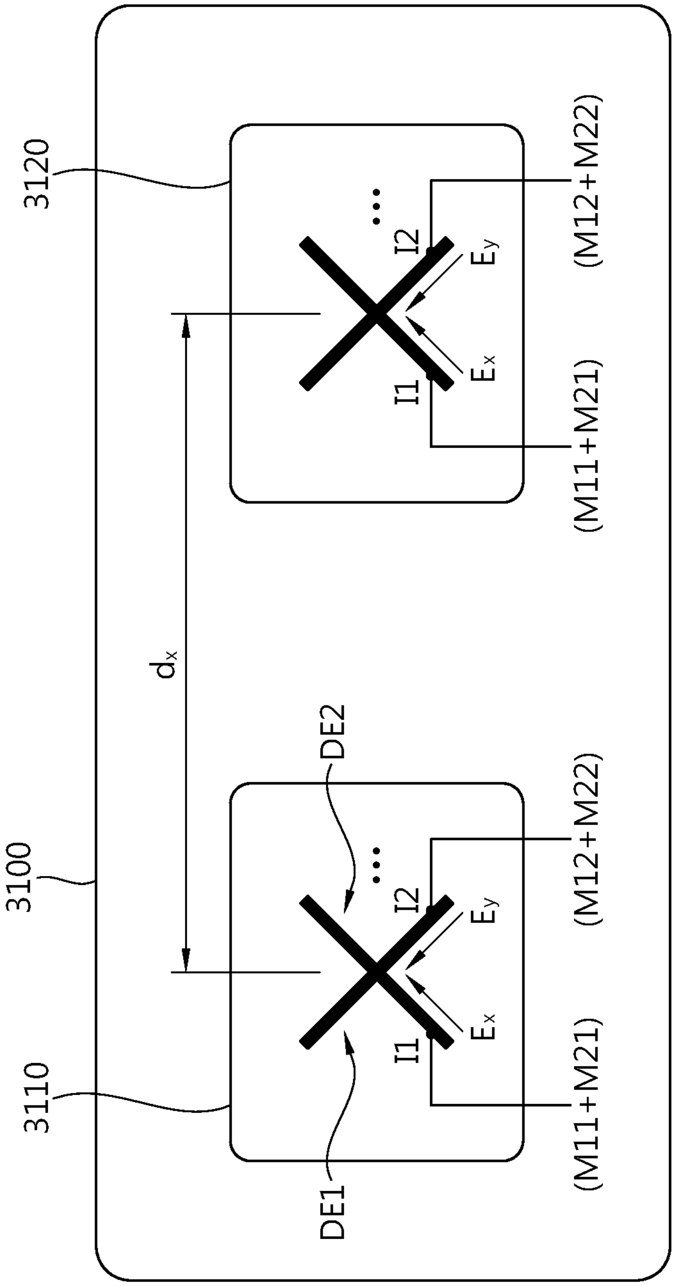
FIG. 5 is a diagram schematically showing a configuration of an active array to antenna element in the real time RF polarization control active array antenna apparatus according to the exemplary embodiment of the present invention.

FIG. 5 is a diagram schematically showing a configuration of an active array antenna element 3100 in the real time RF polarization control active array antenna apparatus 3000 according to the exemplary embodiment of the present invention.

Referring to FIG. 5, left vertical array antenna elements 3110 include eight antenna elements, and right vertical array antenna elements 3120 also include eight antenna elements. The left vertical array antenna elements 3110 and the right vertical array antenna elements 3120 may be disposed, having an interval of $d_x$ therebetween. An array interval between the vertical array antenna elements may be determined according to unique characteristics of an applied antenna element and have an influence on horizontal beam forming and beam scan characteristics.

Each antenna element may have a structure of orthogonal intersecting antenna elements DE1 and DE2 or a structure of orthogonal intersecting dipole elements. For example, the antenna element may have two input terminals I1 and I2 so as to provide two orthogonal components $E_x$ and $E_y$. Therefore, in the case of allowing each antenna element to correspond to users receiving a communication service through the RF polarization control active array antenna according to the exemplary embodiment of the present invention, it is possible to perform a polarization control based on each user.

Two independent signals are combined with each other and input to each input terminal. For example, a signal M11+M21 may be input to the input terminal 1 I1, and a signal M12+ M22 may be input to the input terminal 2 I2. Here, signals M11 and M12 are coherent signals branched from an input signal M1 and each having an amplitude and a phase that may be mutually controlled. In addition, signals M21 and M22 are also coherent signals branched from an input signal M2 and each having an amplitude and a phase that may be mutually controlled.

Two independent signals are combined with each other by a multi active channel unit 3200 to be described below.

Figure 6:
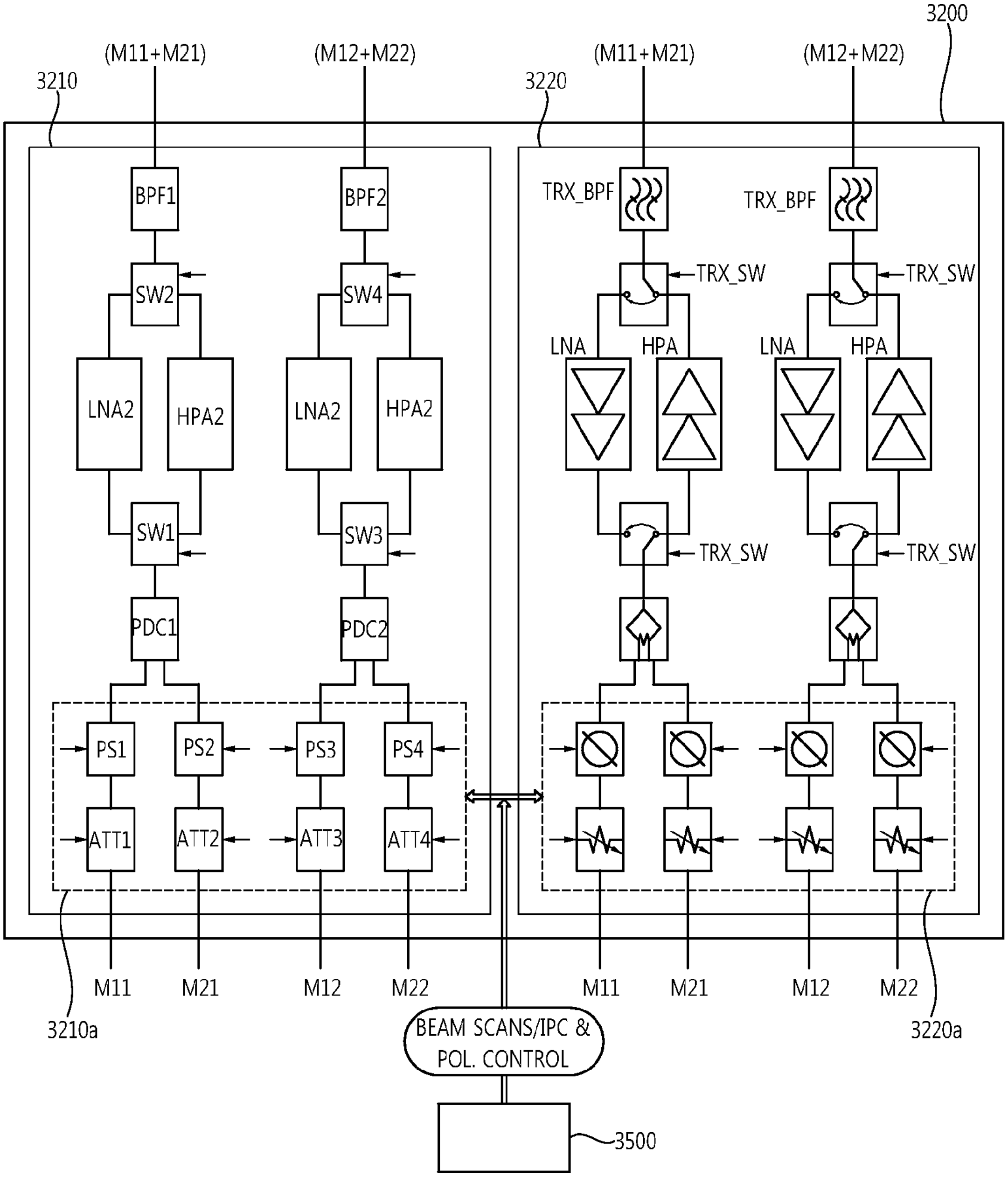
FIG. 6 is a diagram schematically showing an example of a configuration of a multi active channel unit.

FIG. 6 is a diagram schematically showing an example of a configuration of a multi active channel unit 3200. The multi active channel unit 3200 includes two layers and includes eight multi active channel sub units arranged in each of the two layers, that is, a total of sixteen multi active channel sub units 3210 to 3217 and 3220 to 3227. Each of the multi active channel sub units includes four active channels corresponding to four input signals M11, M12, M21, and M22 and outputs two signals M11+M21 and M12+M22 corresponding to the inputs I1 and I2 of each antenna element.

In a transmission mode, each of the multi active channel sub units 3210 to 3217 and 3220 to 3227 has an output interfaced with the antenna element of the antenna element arrays 3110 and 3120 and an input interfaced with the polarization reconstruction coaxial wiring combining unit 3300. In a reception mode, each of the multi active channel sub units 3210 to 3217 and 3220 to 3227 has an input interfaced with the antenna element of the antenna element arrays 3110 and 3120 and an output interfaced with the polarization reconstruction coaxial wiring combining unit 3300.

Each of the multi active channel sub units 3210 to 3217 and 3220 to 3227 includes two end filters BPF1 and BPF2, four RF channel switches SW1 to SW4, two transmission high output amplifiers HPA1 and HPA2, two low noise amplifiers LNA1 and LNA2, two power distributers/combiners PDC1 and PDC2, and vector signal controlling units 3210*a* and 3220*a*.

The vector signal controlling units 3210*a* and 3220*a* include four digital phase shifters PS1 to PS4 and fourth digital power attenuators ATT1 to ATT4.

Here, the end filters BPF1 and BPF2 serve to suppress out-of-band signals.

The four RF channel switches SW1 to SW4 may be simultaneously synchronized and selected so as to provide a transmission and reception channel selection function. Here, a synchronization control signal (T-sync signal) is provided from the base station apparatus.

The transmission high output amplifiers HPA1 and HPA2 provide a function of high-output amplifying a transmission signal at the time of a transmission channel mode. In addition, at the time of a reception channel mode, power of the transmission high output amplifiers is blocked, thereby making it possible to protect the reception low noise amplifiers LNA1 and LNA2. Here, the high output amplifiers may also be blocked through the RF channel switches SW1 to SW4.

The reception low noise amplifiers LNA1 and LNA2 provide a function of low-noise amplifying a reception signal at the time of the reception channel mode. In addition, at the time of the transmission channel mode, power of the low noise amplifiers is blocked, thereby making it possible to protect the low noise amplifiers from the high output signal leaked and input from the high output amplifiers. Here, the low noise amplifiers may also be blocked through the RF channel switches SW1 to SW4.

The power distributers/combiners PDC1 and PDC2 provide a function of combining two transmitted independent input signals M11 and M21 with each other at the time of the transmission channel mode. The power distributers/combiners PDC1 and PDC2 provide a function of distributing two received independent input signals M11 and M21 at the time of the reception channel mode.

The vector signal controlling units 3210*a* and 3220*a* may include four digital phase shifters PS1 to PS4 and fourth digital power attenuators ATT1 to ATT4.

The four digital phase shifters PS1 to PS4 may adjust phases of the respective active channels. Here, the digital phase shifters adjust the phases of the respective channels with respect to the input signal to allow two orthogonal component signals transmitted to the antenna element to have a phase difference of 90 degrees, thereby making it possible to generate a circular polarization.

The four digital power attenuators ATT1 to ATT 4 may adjust amplitudes of the respective active channels. Here, channels for signals to be transmitted among channels to which signals are input may also be selected through the digital power attenuators. For example, attenuation is maximally applied to one of signals input to each channel to remove or minimize a corresponding signal, thereby making it possible to select a desired channel among the channels to which the signals are input.

The adjustment of the amplitudes and/or the phases through the vector signal controlling units 3210 and 3220*a* is performed by the antenna controlling unit 3500. The amplitude and/or the phase of the active channel is controlled through the antenna controlling unit 3500, thereby making it possible to perform real time polarization reconstruction, beam forming and beam scan, initial phase compensation, and the like. The antenna controlling unit 3500 receives various control signals from the monitoring/controlling unit 3800 to transfer a control command to the multi active channel unit 3200. The monitoring controlling unit 3800 may be configured separately from the antenna apparatus 3000, and a user/manager may control parameters on transmission of the antenna apparatus through the monitoring/controlling unit 3800 as described below.

Figure 7:
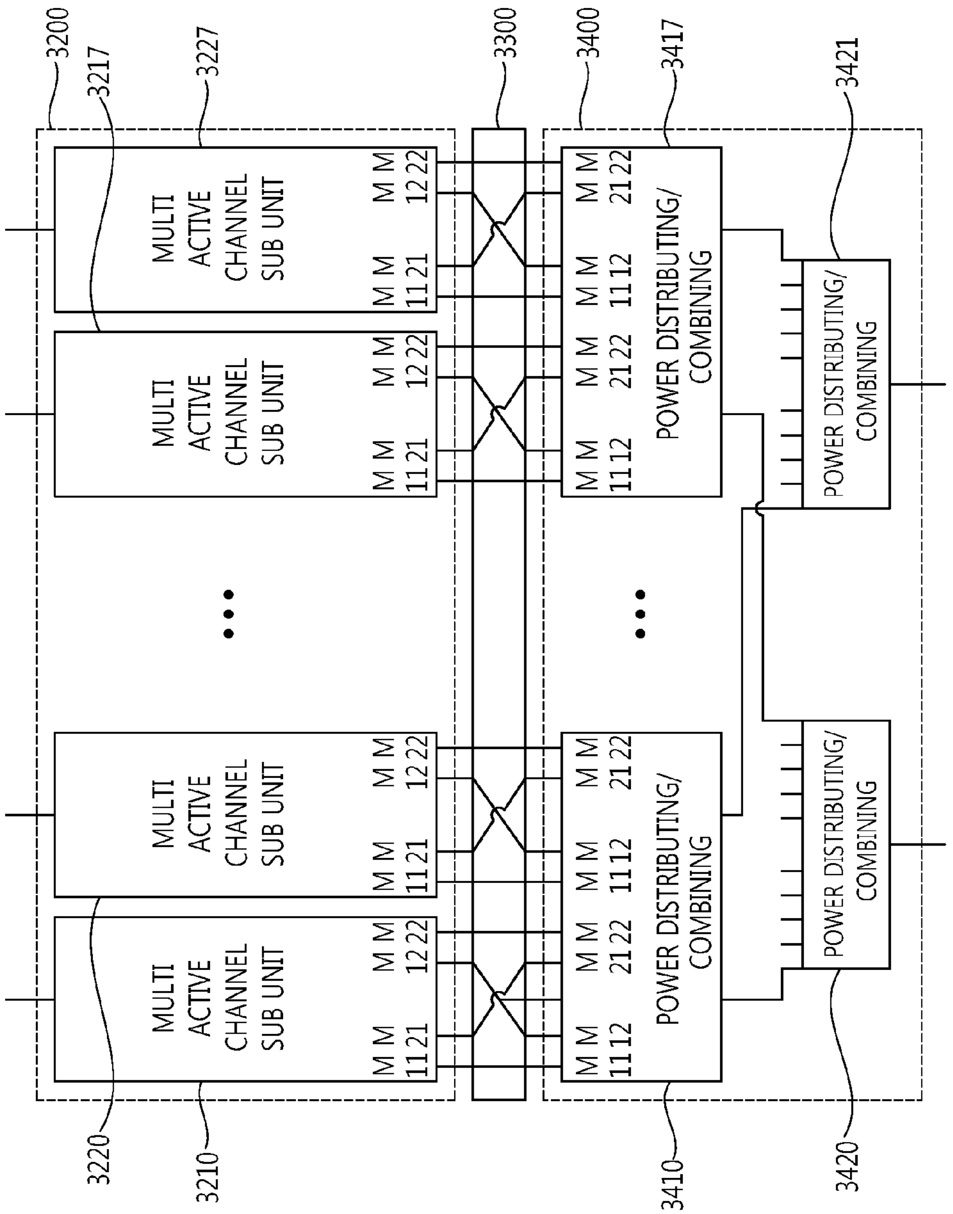
FIG. 7 is a diagram schematically showing a coaxial wiring relationship of a polarization reconstruction combining unit according to the exemplary embodiment of the present invention and an example of a configuration of a power distributing/combining unit.

FIG. 7 is a diagram schematically showing a coaxial wiring relationship of a polarization reconstruction combining unit according to the exemplary embodiment of the present invention and an example of a configuration of a power distributing/combining unit.

An intermediate portion of FIG. 7 shows a coaxial wiring relationship of the polarization reconstruction combining unit 3300. Referring to FIG. 7, the polarization reconstruction combining unit 3300 provides a function of replacing an RF wiring in order to reconstruct two signals and transmission and reception polarizations. For example, referring to FIG. 7, the polarization reconstruction combining unit 3300 allows two independent RF signals M11 and M21 to be input to two left channels configuring the multi active channel sub unit 3210 and allows two independent RF signals M12 and M22 to be input to two right channels configuring the multi active channel sub unit 3210.

A lower end portion of FIG. 7 shows an internal configuration of the power distributing/combining unit 3400.

Referring to FIG. 7, the power distributing/combining unit 3400 includes two 1-8 way power distributers/combiners 3420 and 3421 and sixteen 2-8 way power distributers/combiners 3410 to 3471. The power distributing/combining unit 3400 distributes power of two independent input signals to output each 32 (a total of 64) signal, at the time of the transmission channel mode. Similarly, the power distributing/combining unit 3400 distributes power of each 32 (a total of 64) input signal to output two independent signals, at the time of the reception channel mode.

Hereinafter, again referring to FIG. 4, the real time RF polarization control active array antenna apparatus 3000 according to the exemplary embodiment of the present invention will be additionally described.

The antenna controlling unit 3500 of FIG. 4 receives various control signals from the monitoring/controlling unit 3800 to transfer a control command to the multi active channel unit 3200. Here, as the control signals input from the monitoring/controlling unit 3800, there are an amplitude and/or phase control signal, a power turn on/off control signal, a beam forming and beam scan control signal, a polarization control signal, and the like.

The antenna controlling unit 3500 may also collect status information of each of the 16 multi active channel sub units 3210 to 3217 to 3220 to 3227 to transfer the status information to the monitoring/controlling unit 3800 and may transfer a synchronization control (T Sync) signal received from the frequency converting/digital to optical converting units 3600 to each of the 16 multi active channel sub units 3210 to 3217 and 3220 to 3227. Here, the antenna controlling unit 3500, the multi active channel unit 3200, and the monitoring/controlling unit 3800 may communicate with each other in, for example, a RS232C serial communication (38, 400 bps, half duplex) scheme.

The frequency converting/digital to optical converting unit 3600 includes two frequency converting units 3610 and 3620, a local oscillator 3630 synchronized with an external reference frequency (for example, 10 MHz) (for example, a phase locked loop (PLL) type local oscillator), and a digital to optical converter 3640. The frequency converting/digital to optical converting unit 3600 performs digital to optical interfacing with the donor unit 150 and provides a frequency conversion function and a function of converting a digital optical signal into an RF signal and/or amplifying and transmitting the digital optical signal. The digital to optical converter 3640 separates the independent signals, for example, M1 and M2, received from the donor unit and supplies each of the separated signals to the frequency converting units 3610 and 3620.

The power supplying unit 3700 of FIG. 4 converts alternate current (AC) power into direct current (DC) power to supply the DC power to each active unit, for example, the antenna controlling unit 3500, the frequency converting/digital to optical converting unit 3600, the multi active channel unit 3200, and the like. The power supplying unit 3700 supplies power to each channel configuring the sub units of the multi active channel unit 3200, thereby making it possible to increase power efficiency.

The monitoring/controlling unit 3800 of FIG. 4 may be installed inside the home, separately from the antenna apparatus 3000, and communicate with the donor unit 150 through a universal serial bus (USB) terminal in the RS232C serial communication (38, 400 bps, half duplex) scheme. In addition, the monitoring/controlling unit 3800 may passively control the synchronization control (T Sync) with respect to an uplink and a downlink.

The monitoring/controlling unit 3800 may communicate with the antenna controlling unit 3500 in the RS232C serial communication (38, 400 bps, half duplex) scheme. Therefore, the monitoring/controlling unit 3800 may provide a function of controlling the amplitude and/or the phase control, a function of controlling the power turn on/off, a function of controlling the beam forming and/or beam scan, a function of controlling the polarization reconstruction, a function of collecting the status information (a power level, a temperature, or the like) of each 16 sub unit, and a function of setting a monitor, a TDD guide offset, a TDD receive-to-transmit transition gap (TDD RTG), a TDD transmit-to-receive transition gap (TDD TTG), or the like, of the multi active channel unit 3200.

In contrast with the donor unit of the base station system according to the related art, the donor unit 150 has a modified firmware so that it is interfaced with the monitoring/controlling unit 3800.

Figure 8:
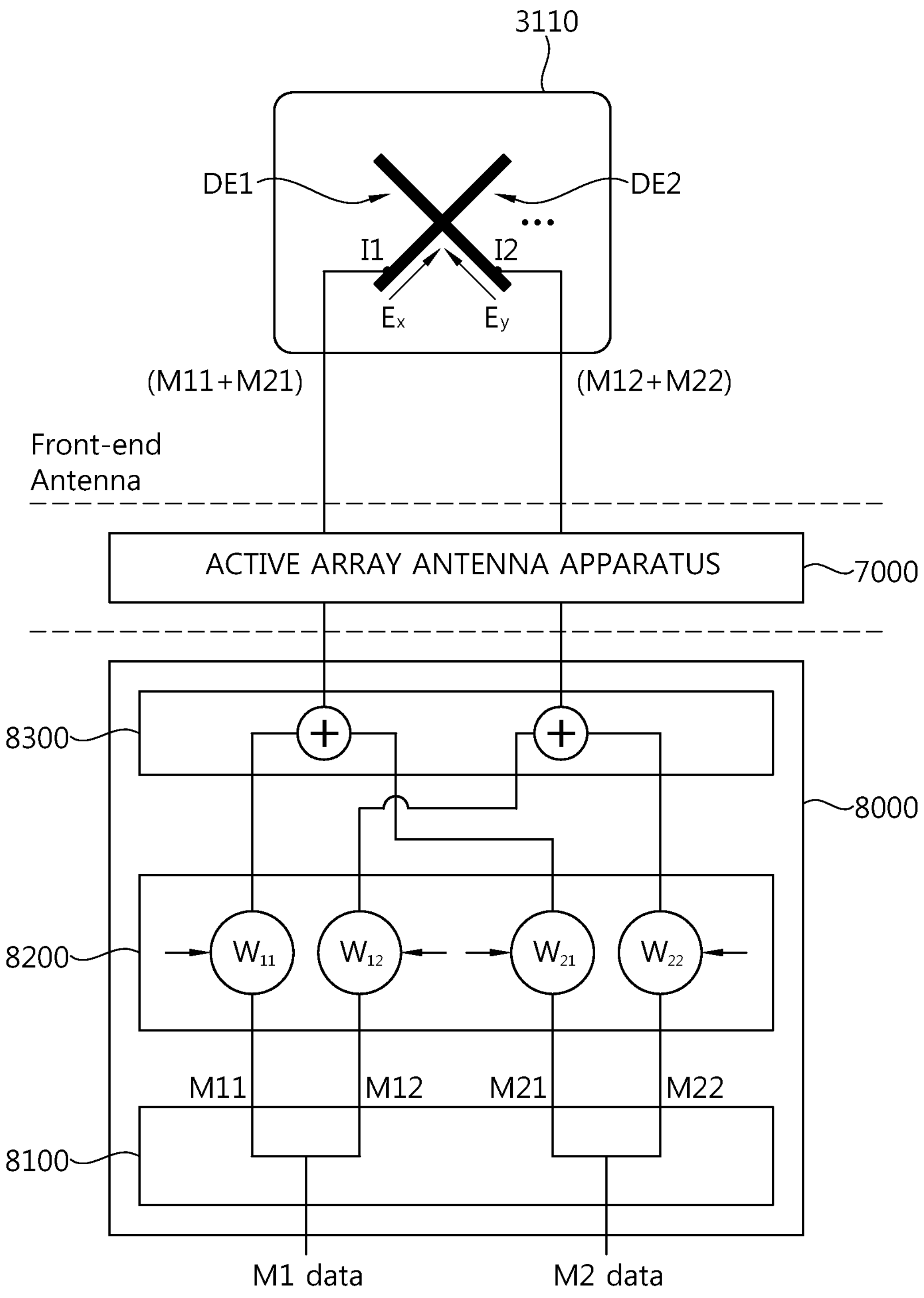
FIG. 8 is a diagram schematically showing a configuration of a baseband/modem polarization control active array antenna apparatus.

FIG. 8 is a diagram schematically showing a configuration of a baseband/modem polarization control active array antenna apparatus according to another exemplary embodiment of the present invention.

In the exemplary embodiment of FIG. 8, the distributing/combining function of the power distributing/combining unit 3400, the function of the polarization reconstruction combining unit 3300, and the functions of the digital power attenuators ATT1 to ATT4 and the digital phase shifters PS1 to PS4 of the multi active channel sub units 3210 to 3217 and 3220 to 3227 in the exemplary embodiment of FIGS. 4 to 7 may be performed in a baseband/modem unit 8000 positioned at the donor unit or the baseband base station apparatus. Therefore, in the exemplary embodiment of FIG. 8, an active array antenna apparatus 7000 performs a function required for transmitting and receiving signals in addition to the above-mentioned functions.

The baseband/modem unit 8000 includes a demultiplexer (DEMUX) unit 8100 distributing digital signals in terms of transmission, a vector signal controlling unit 8200 control amplitudes and phases of the distributed digital signals, and a multiplex (MUX) unit 8300 combining the amplitude and/or phase controlled digital signals with each other. Two independent input data M1 data and M2 data pass through the vector signal controlling unit 8200 and are then combined with each other.

Next, the combined signals pass through the active array antenna apparatus 7000 and are then input to a single orthogonal dual polarization antenna element 3110 in order to simultaneously generate two independent orthogonal polarizations. Here, the two dual polarizations may be generated by controlling weighting factors (complex factors controlling the amplitude and the phase) $W_{11}$, $W_{12}$, $W_{21}$, and $W_{22}$.

In addition, in order to obtain an array gain, at the time of use of the array antenna, the input signals may be distributed and used by the number of array antennas in the active array antenna apparatus 7000 or the baseband/modem unit 8000.

Figure 9:
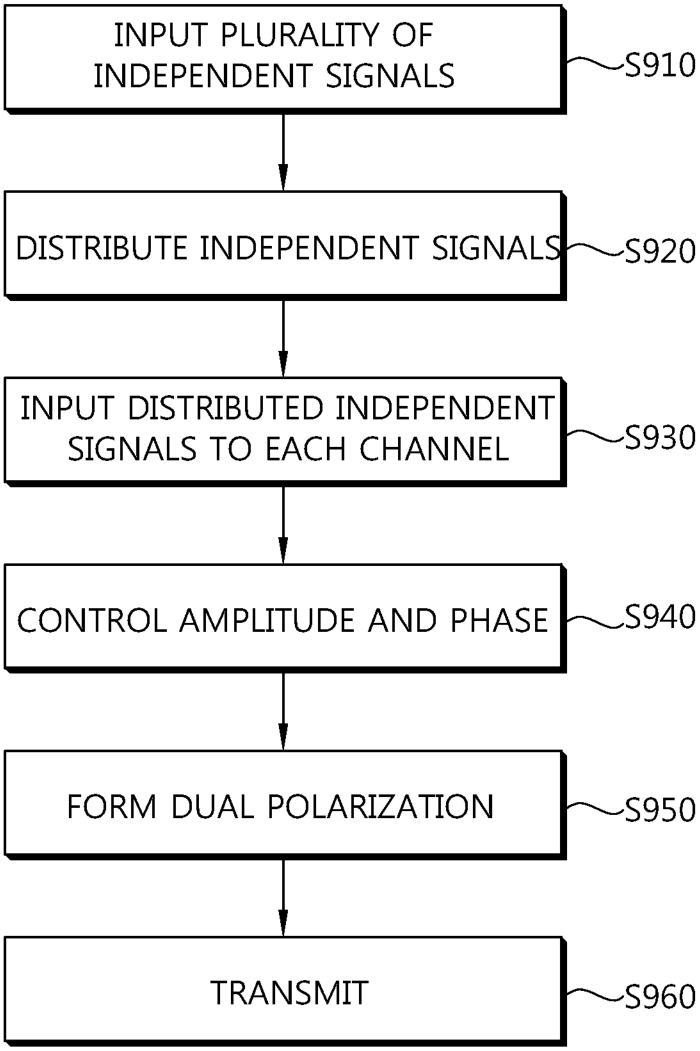
FIG. 9 is a flow chart schematically showing an operation of a system including the real time RF polarization control active array antenna apparatus according to the exemplary embodiment of the present invention in a transmission mode.

FIG. 9 is a flow chart schematically showing an operation of a system including the real time RF polarization control active array antenna apparatus according to the exemplary embodiment of the present invention in a transmission mode.

A plurality of independent signals M1 and M2 are input from a base station to an antenna apparatus (S910). The independent signals input to the antenna apparatus is subjected to optical to digital conversion and is subjected to sync control and frequency conversion if needed.

The independent signals M1 and M2 are distributed as each element independent signal (S920).

Each of the independent signals M1 and M2 is distributed as a plurality of independent signals M11 and M12, and M21 and M22. The independent signals M11 and M12 are first and second independent signals distributed from the independent signal M1. The independent signals M21 and M22 are first and second independent signals distributed from the independent signal M2.

The distributed independent signals are input to each of the channels (S930). Each of the channels corresponds to each of the independent signals in a one-to-one scheme, and each of the independent signals may be input to each of the channels.

Amplitudes and/or phases of the independent signals passing through each channel are adjusted (S940). The amplitudes and/or the phases of the independent signals may be controlled for each channel.

In order to control the amplitudes and/or the phases of each of the independent signals, a attenuator and a phase shifter may be used for each channel. In addition, in order to control the amplitudes and/or the phases of each of the independent signals, each of the weighting factors $W_{11}$, $W_{12}$, $W_{21}$, and $W_{22}$ may be added to each of the independent signals. Here, the weighting factors, which are complex factors, adjust the amplitudes and the phases of each of the independent signals.

The amplitude and phase controlled independent signals are combined with different independent signals to form a dual polarization (S950). A single independent signal is combined with a different kind of independent signal as represented by Equation. 1.

$$E1=M11'+M21'$$

$$E2=M12'+M22' \quad \text{[Equation 1]}$$

Where M11', M12', M21', and M22' indicate phase and/or amplitude controlled independent signals, and E1 and E2 indicate orthogonal component signals (polarization signals) input to each intersecting structure in a single antenna element having an orthogonal intersecting structure or an orthogonal intersecting dipole structure.

Here, when the M1 and the M2 are the same signal, the antenna apparatus according to the exemplary embodiment of the present invention transmits the same signal.

Here, when the M1 and the M2 are the different signals, the antenna apparatus according to the exemplary embodiment of the present invention is a MIMO system and may obtain a transmission diversity effect. For example, when the M21' and M12' are removed through the attenuator, a single antenna may transmit two independent signals orthogonal to each other. Even in the case in which the M1 and the M2 are the different signals, only signals on one sides such as M11 and M12 or M21 and M22 are removed, thereby making it possible to selectively transmit only the same signal.

Two polarizations E1 and E2 are transmitted through the antenna element (S960).

The present invention may also be applied to a system including a real time RF polarization control active array antenna apparatus in a reception mode.

In the case of the system the real time RF polarization control active array antenna apparatus in the reception mode, operations in the transmission mode described in FIG. 9 are reversely applied to received polarization signals, thereby making it possible to obtain the independent signals.

Although the TDD type WiMAX (or Wibro) system has been described as an example of the system according to the exemplary embodiment of the present invention for convenience of explanation, the present invention is not limited thereto. That is, the spirit of the present invention may be applied to various systems. For example, the spirit of the present invention may also be applied to a FDD type WiMAX (or Wibro) system by excluding the switches SW1 to SW4 in the exemplary embodiment of FIG. 6 and may also be applied to a long term evolution (LTE) system.

In contents described in the present specification, work performed in a communication network may be performed during a process of controlling the communication network and transmitting data in a system (for example, a server, a base station, or the like) managing the communication network or be performed in a terminal coupled to the communication network.

With the antenna apparatus according to the exemplary embodiments of the present invention, the polarization control adapted for a real time or long term wireless communication environment change is performed, polarization characteristics of the antenna are provided for each of wireless communication environment adaptation sector user groups, thereby making it possible to improve communication service quality and increase communication capacity.

In addition, according to the exemplary embodiments of the present invention, a wireless electric wave may be efficiently and optimally operated and utilized so as to be adapted for the future various services and complex wireless environment. In addition, a technology in which a wireless communication environment adaptation real time polarization control technology and a MIMO signal processing technology are combined with each other in order to transmit data at a high speed may be widely applied to the next generation mobile communication base station/relay array antenna system.

Further, in the present invention, "comprising" a specific configuration will be understood that additional configuration may also be included in the embodiments or the scope of the technical idea of the present invention.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A transmission antenna apparatus comprising:

a signal distributing unit distributing a plurality of input signals to generate independent signals;

a channel inputting unit inputting each of the independent signals to a corresponding channel;

a multi channel unit including channels to which the independent signals are input, and adjusting phases and/or amplitudes of the independent signals for each of the channels to generating a dual polarized signal by combining the adjusted independent signals; and a dual polarization antenna unit having antenna components which correspond to the channels in the multi channel unit and transmitting the dual polarization signal, wherein the phases and/or amplitudes of the independent signals are adjusted equally in all of the antenna components.

2. The apparatus of claim 1, wherein the multi channel unit temporally adjusts the phases and/or the amplitudes of the independent signals.

3. The apparatus of claim 1, wherein an antenna component of the dual polarization antenna unit has a structure of an orthogonal cross, and dual polarized signals are generated based on the structure.

4. The apparatus of claim 1, wherein the dual polarization antenna has a structure of orthogonal dipoles, and dual polarized signals are generated based on the structure.

5. The apparatus of claim 1, wherein the signal distributing unit distributes each of two input signals into two independent signals along with directions of an antenna component of the dual polarization antenna unit, wherein the multi channel unit adjust the independent signals in phases and/or amplitudes along the directions, and wherein the dual polarization antenna unit transmits dual polarized signal which is generated by combining the adjusted independent signals.

6. The apparatus of claim 1, wherein the signal distributing unit distributes each of two input signals into two independent signals along with directions of an antenna components of the dual polarization antenna unit, and wherein the dual polarization antenna unit transmits dual polarized signals which are generated by combining the independent signals.

7. The apparatus of claim 1, wherein the channel inputting unit inputs the independent signals into the corresponding channels alternatively based on the directions of the independent signals.

8. A method for transmitting a signal using a dual polarization antenna, the method comprising:

distributing a plurality of input signals into independent signals;

inputting each of the plurality of independent signals to a corresponding channel;

adjusting phases and/or amplitudes of the independent signals for each of the channels to which the independent signals are input to generating a dual polarized signal by combining the independent signals; and transmitting the dual polarized signal, wherein the dual polarization antenna has antenna components corresponding to the channels, and wherein the phases and/or amplitudes of the independent signals are adjusted equally in all of the antenna components.

9. The method of claim 8, wherein the phases and/or amplitudes of the independent signals are adjusted temporally.

10. The method of claim 8, wherein an antenna component of the dual polarization antenna has a structure of an orthogonal cross, and dual polarized signals are generated based on the structure.

11. The method of claim 8, wherein the dual polarization antenna has a structure of orthogonal dipoles, and dual polarized signals are generated based on the structure.

12. The method of claim 8, wherein each of two input signals distributed into two independent signals along with directions of an antenna component of the dual polarization antenna, wherein the independent signals adjusted in phases and/or amplitudes along the directions, and wherein a dual polarized signal which is generated by combining the independent signals is transmitted through the dual polarization antenna.

13. The method of claim 8, wherein each of two input signals distributed into two independent signals along with directions of an antenna component of the dual polarization antenna, and wherein dual polarized signal which are generated by combining the independent signals through the dual polarization antenna.

14. The method of claim 8, wherein the independent signals are input into the corresponding channels alternatively based on the directions of the independent signals.

* * * * *